Dec. 30, 1930.  W. GILBERT  1,786,841
AIR SPEED INDICATOR
Filed May 28, 1925   5 Sheets-Sheet 1
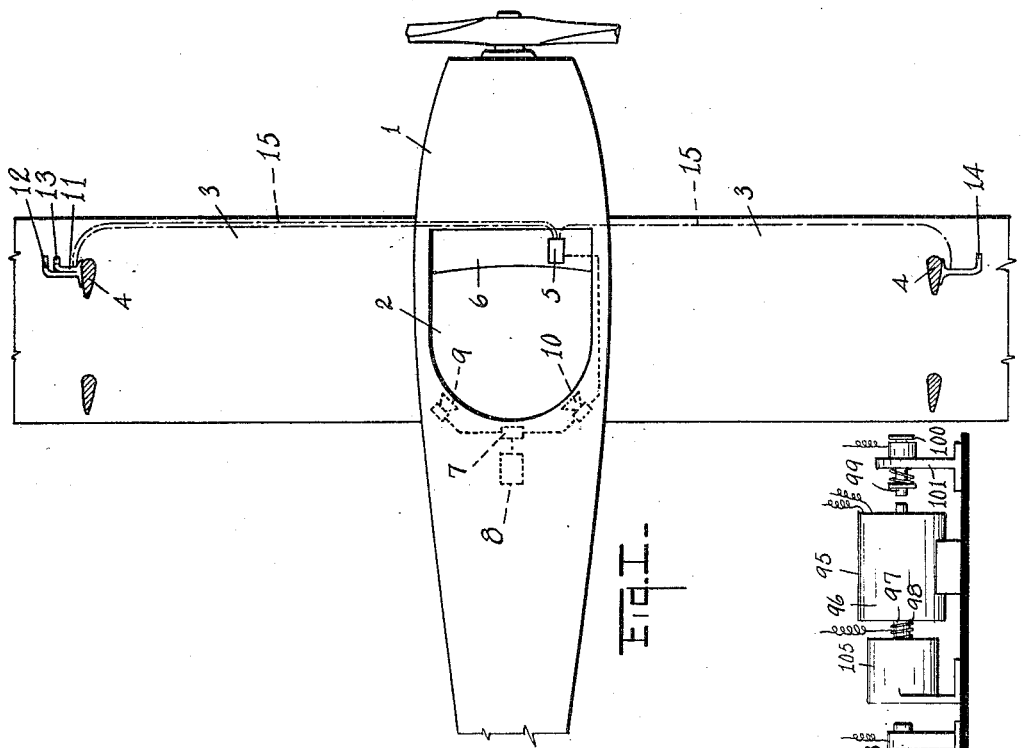
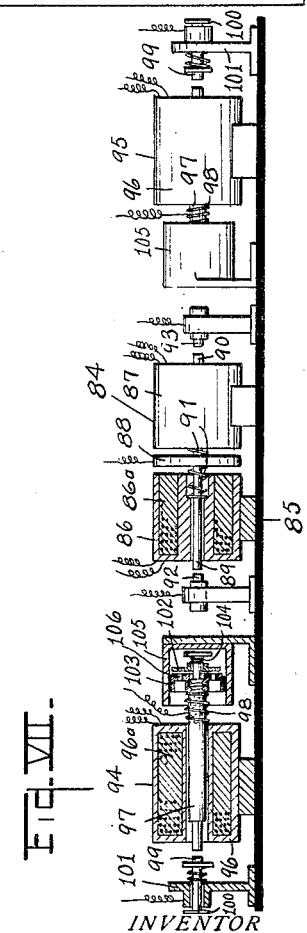
INVENTOR
Walton Gilbert
BY
ATTORNEYS Dec. 30, 1930.  W. GILBERT  1,786,841
AIR SPEED INDICATOR
Filed May 28, 1925   5 Sheets-Sheet 2
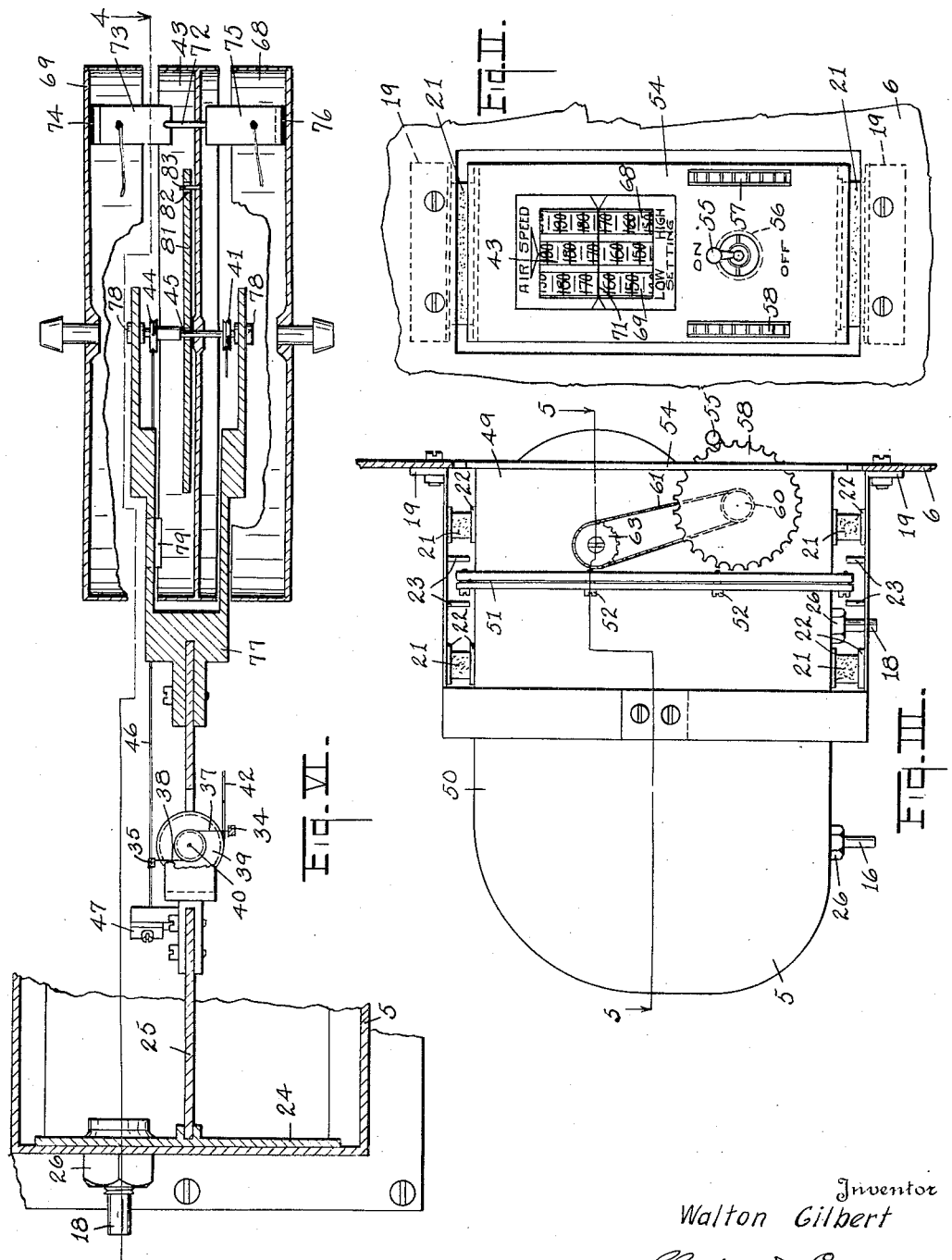
Inventor
Walton Gilbert
By Chappell & Earl
Attorneys

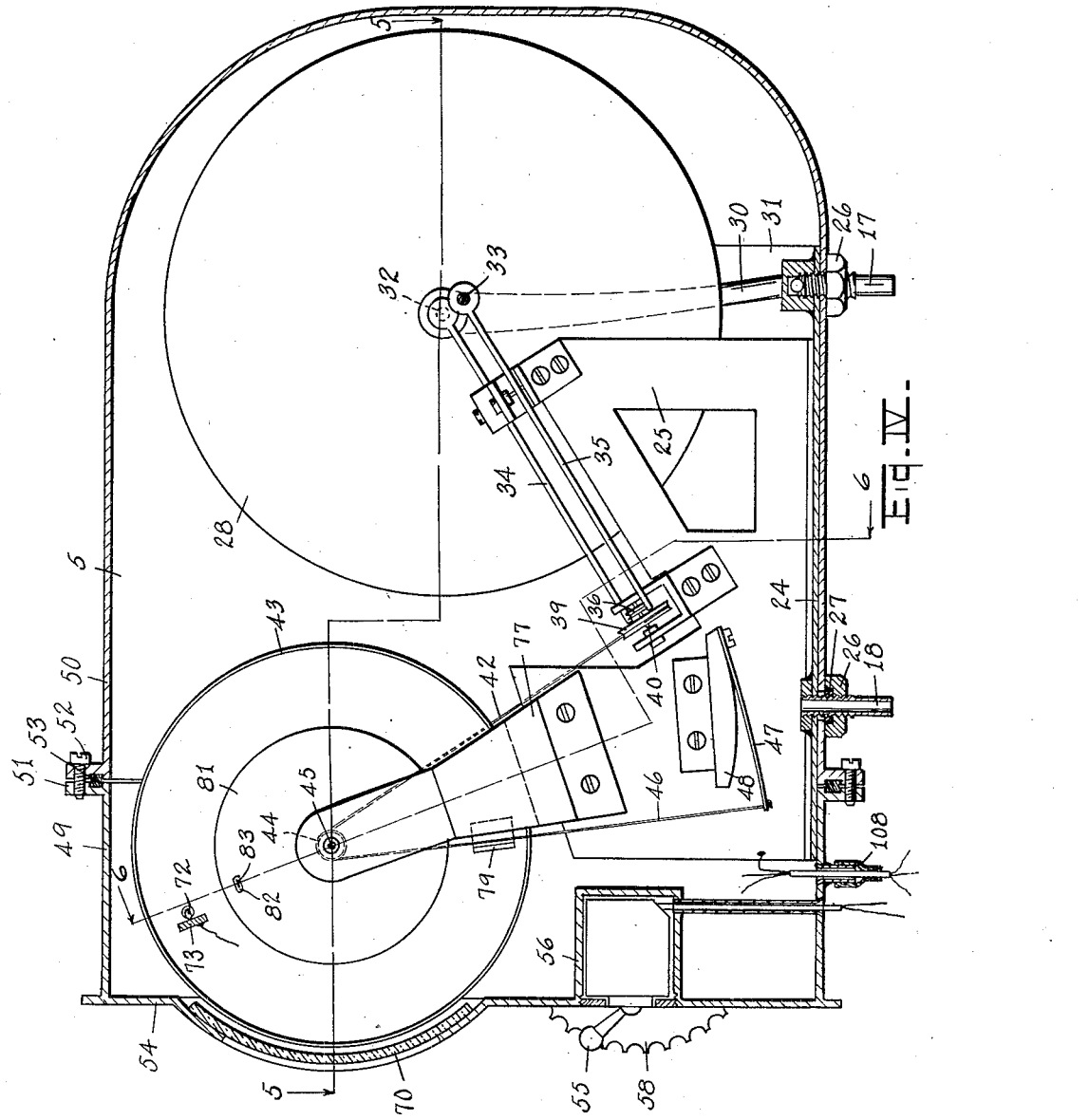

Dec. 30, 1930.  W. GILBERT  1,786,841
AIR SPEED INDICATOR
Filed May 28, 1925  5 Sheets-Sheet 4
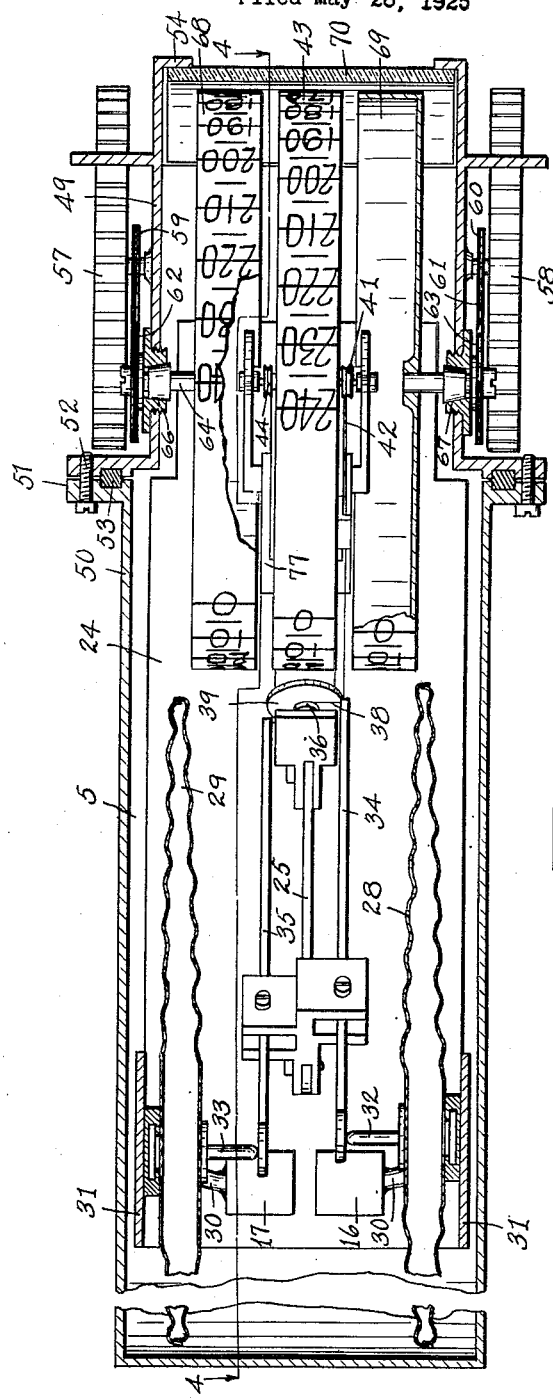
FIG. V.
Inventor
Walton Gilbert
Chappell & Earl
By
Attorneys

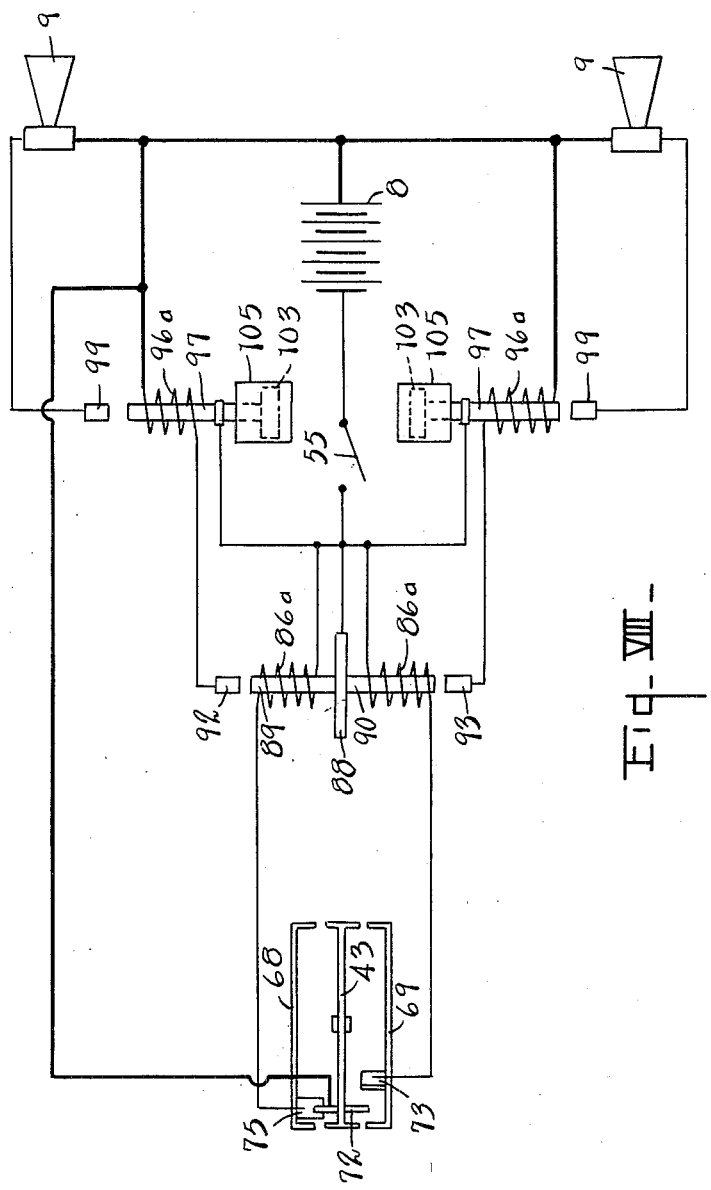

Patented Dec. 30, 1930

1,786,841

UNITED STATES PATENT OFFICE

WALTON GILBERT, OF PASADENA, CALIFORNIA

AIR-SPEED INDICATOR

Application filed May 28, 1925. Serial No. 33,426.

This invention relates to an improved air speed indicator for airplanes that is specially adapted and accurate for aerobatic flying and particularly adapted to use as a means of precision speed control. This application is a continuation in part of my co-pending application Serial No. 662,012, filed Sept. 10, 1923, and 415,831, filed Oct. 9, 1920.

The objects of the invention are:

First, to provide an indicator that will indicate the airspeed accurately within any desired flying range and be likewise effective when the airplane is banking.

Second, in an audible indicating means, to provide a new and improved instrument which will enable Naval Air Service pilots to land upon airplane carriers, flying accurately within a low speed range while their whole vision and attention is concentrated upon the manœuvre of landing. In this manœuvre it is necessary to flatten out from the glide and land on a pitching surface and at the same time regulate the speed nicely so as not to roll over the side after landing or stall the airplane before landing.

Third, to provide an improved instrument combining and coordinating both audible and visual speed indication.

Fourth, to provide an audible indicator means that will assist student pilots in learning to land at proper speeds and execute clean manœuvres without loss of speed due to side slipping and skidding.

Fifth, to provide an adequate means of speed regulation in night flying. Especially when there is no visible "horizon" the night pilot ordinarily has great difficulty in keeping his attention on the course he is following or the work he is doing and at the same time regulating his airspeed by customary means.

Sixth, to provide a visual indicator with audible regulation having complete adjusting means set in the face of the instrument to enable the pilot to alter the speed range setting without difficulty while in flight.

Seventh, to provide a means of speed regulation in cloud flying. In this case the pilot must simultaneously watch compass, turn indicator and airspeed indicator. By making the airplane speed control audible, the fatigue is lessened materially and the pilot may fly through clouds indefinitely without loss of direction or control.

Eighth, to provide an instrument which will serve the special needs of a service pilot accurately and efficiently while engaged in combat or other aerobatic manœuvres.

Further objects, and objects pertaining to details and economies of construction and operation of my invention will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawing forming a part of this application, in which:

Figure I is a partially broken detail plan view of the central part of an airplane showing my invention installed in a biplane with its top wing cut off, fragmentary portions of the fuselage and the bottom winged portion of the airplane being shown, the struts being shown in section.

Fig. II is a front elevation showing the face of the instrument.

Fig. III is a side elevation of the instrument showing the casing and casing support.

Fig. IV is a detail sectional side elevation showing the pressure sensitive mechanism on line 4—4 of Fig. V.

Fig. V is a sectional plan view taken along irregular line 5—5 of Fig. IV showing the pressure sensitive mechanism and the adjustment mechanism.

Fig. VI is a detail sectional elevation along irregular line 6—6 of Fig. IV showing the pressure sensitve mechanism in part and the adjusting wheels.

Fig. VII is an elevation partially in section on line 7—7 of Fig. VIII showing the relay system.

Fig. VIII is a diagrammatic view of the electric circuit showing the contact and connections to the intonators.

In the drawings similar reference characters refer to similar parts throughout the several views, and the sectional views are taken looking in the direction of the little arrows at the ends of the section lines.

In order that the needs of a pilot in combat for audible precision speed control may be clearly appreciated, it is necessary first to note that the airplane in a fight is continually turning and thus banking continually, this being necessary since the plane makes an easy target when flying straight. The conventional type of indicator is not accurate during a bank due to difference in wing-tip velocities. The general practice is to place the pressure head out on the wings at the front or between the wings on a front strut; it cannot be centralized on account of propeller slip stream interference. In even a slow type ship this wing speed difference between the outer struts on opposite sides of the center has been found to be as much as 5 to 7 miles per hour at 70 miles per hour, readings being taken within a second or so of one another. It is of still greater importance in high speeds.

The flying rate of climb curve which is typical of airplanes generally is also important in this connection.

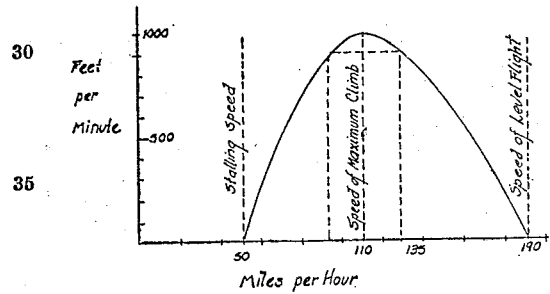

In a fight the full available horse power of the airplane is used. If the plane is nosed up at too steep an angle the speed falls off and the climb decreases until it becomes zero at the stalling speed, say 50 m. p. h. On the other hand, if the ship's angle of inclination with the horizon is decreased, the speed picks up uniformly until the plane is flying level at some such speed as 190 m. p. h. The rate of climb is affected by both the speed and the inclination of the airplane. Thus the rate of climb increases (as the speed is increased from the stalling speed by decreasing the angle of inclination of the airplane), reaches the maximum at some such speed as 133 m. p. h., and then the rate of climb decreases to zero as the angle of incline is diminished, and becomes zero when the plane is flying level. The fact that the airplane is banking does not alter the general form of the curve.

Since the art of combat involves outclimbing the enemy it is necessary to fly near the speed of maximum rate of climb, and in view of the fact that the pilot must keep his opponent under observation at all times it is extremely difficult and, therefore, generally accepted as bad practice for him to regulate his speed by glancing at his speed indicator. The pilot is thus left to control his speed intuitively, a means which varies widely with the excitement of combat and as between individual pilots.

Moreover, it is not sufficient to fly at a high rate of climb since there are two speeds for every rate of climb except the maximum for example, speeds A and B of curve have the same rate of climb, and of two equal planes flying at the same rate of climb, the one flying faster has a decided advantage. Such considerations indicate the value of a means of precise speed range control which permits the pilot to fly within any desired range without distracting his attention from his manœuvring. An experimental model performing the function of the invention to be described has been tested by the Army Air Service, and official reports reveal the conviction of pilots that its function is decidedly advantageous.

It is essential to the utility of this device that the pressure heads shall be situated outside of the immediate region where the airflow is affected by the wings or other portions of the airplane. In this connection it is to be noted that the reaction of the wing or airfoil for any given speed alters as the net weight of the airplane changes and since airplanes do not fly without burning fuel, it follows that no instrument, having pressure heads situated at the surface of the airfoil where this reaction is pronounced, can be calibrated to read the speed with accuracy. The variation in weight of loads carried from flight to flight would also contribute very materially to the errors of such instruments used as speed indicators.

It is also necessary that there shall be complete adjusting means fixed in the face of the instrument, so that the audible function of the instrument may be set at will to any of the several ranges necessary for night flying, climbing up through a cloud, combat, landing in a restricted area, student instruction, or for any of the several uses where accurate audible speed control is desirable.

A special elastic suspension mounting is provided to decrease the amplitude of oscillation of the indicator due to vibrations transmitted by the airplane structure to the instrument. Due to these oscillations contact is made somewhat before the limiting speed has actually been reached, and then if such oscillations are large an appreciable error would be introduced.

Considering the drawings, the parts will be identified by their numbers. 1 is the fuselage, 2 is the cockpit, 3 the wings, and 4 the vertical outer front inter-plane struts of the wings, all here shown in diagrammatic and conventional form as my invention does not pertain to these parts.

5 is the case of the instrument appearing on the instrument board 6 tilted at an angle of 45° or more to the horizontal. 7 is the casing of the relay system. 8 is the casing of the source of electro-motive force (battery or generator); 9 is the minimum and 10 the maximum intonators, positions of which are indicated by dotted lines in Fig. I.

11 is a Pitot-static pressure head of standard type comprising a dynamic head 12 and a static head 13. 14 is a dynamic head like 12. 11 and 14 are mounted each on one of the two outer front inter-plane struts 4. The two dynamic heads 12 and 14 are each connected through individual tubes 15 to one of two dynamic tube connections 16, 17 on the bottom of the instrument case 5, (see Figs. III, IV, V and VI) through suitable flexible tubing. The static head 13 is similarly connected to opening 18, (see Figs. III, IV and VI) and communicates with the inside of the casing.

19 is the instrument support (Fig. III), which is screwed on the instrument board 6 of the airplane, here shown in side elevation and also indicated in front elevation in Fig. II, dotted behind instrument board.

21 designates the four shock absorber cushions made of porous sponge rubber or other suitable material, held in place by the eight cups 22.

23 designates the stops which prevent excessive fore and aft movement of the case within its supporting frame, which movement might be caused by the unevenness of landing field or surface over which the airplane is rolling.

The horizontal base plate 24 (Figs. IV, V and VI) and the vertical plate 25 together constitute the supporting frame of the pressure sensitive actuating mechanism of the instrument. The tube connections 16, 17 and 18 into the case, clamp the mechanism supporting frame in place. The connections are made air tight by nuts 26 with rubber washers 27 (Fig. IV).

28, 29 are two barograph cells connected respectively to the tube connections 16, 17 by means of short tubes 30 flattened at the barograph end (Figs. IV and V), and thence through individual tubes 12, 14 respectively. The plate 24 is cut in the shape of a T, arms 31 of the T being bent at right angles to form supports for the barograph cells.

It will be seen (Fig. V) that as the pressure within the dynamic tubes increases the barograph cells will tend to expand toward the center. The variation of the static pressure within the case will also contribute to the resultant pressure of the cells. This movement of the barograph cells acting through the pins 32, 33 (Fig. V) rotates the two levers 34, 35 so that the opposite ends of the levers are moved away from each other. It will be seen from Fig. VI that these levers act as a couple on the sheave 36 causing it to rotate. The levers 34, 35 are of different lengths but their ratios are identical, so that equal movements (or expansions) of the barograph cells, and equal forces exerted by the barograph cells, are transmitted equally by the two levers to the wheel 40. The sheave 36 is connected to the levers 34, 35 by fine tungsten wires 37, 38, each wire being wrapped part way around the sheave, the end of the wire being fastened to the sheave. Rotation of the sheave 36 causes the sheave 39 to rotate also, since both sheaves are connected integrally to the same shaft 40. The sheave 39 is connected to the sheave 41 by a single fine tungsten wire 42 wrapped about each sheave and fastened to it after the manner described for 37 (Fig. VI), the motion thus being transmitted to the sheave 41 (Fig. VI) to the indicating wheel 43 and the sheave 44,—41, 43 and 44 all being integrally connected to the same shaft 45 (Fig. VI). The sheave 44 is connected through a single fine tungsten wire 46 to the leaf spring 47 bearing against the cam 48 (see Figs. IV and VI).

The leaf spring 47 thus opposes the barograph cells 28, 29 through the system of wires, sheaves and levers described. The cam 48 is given such a curve that the rotation of the wheel 43 is substantially proportional to the speed corresponding to the pressure of the barograph cells on the levers 34, 35.

The barograph cells are broad disks with a large number of corrugations, and their elasticity is sufficiently great so that the opposing force or tension of the leaf spring 47 always restrains the barograph cells from expanding as far as they would if unopposed. For this reason each cell is always pressing against its lever regardless of the difference in air pressures acting in the two cells. It follows that the cells are expanded equally at all times, even though the forces transmitted by the cells are not always equal, and it is not possible for the wire from either lever to the wheel 40 to be slack. (It should be understood that we are dealing with a difference in wing-tip speeds which will not exceed 10 to 12 miles per hour.) It has been proven experimentally by the applicant that barograph cells of the type described, when coupled to Pitot static heads, have the following characteristic,—that for a given degree of expansion the force exerted by the cell is very closely proportional to the air speed acting on the Pitot-static head to which the cell is connected. Thus if the airplane goes into a bank causing the airspeed to decrease 3 miles per hour at one wing-tip, and to increase 3 miles per hour at the other wing-tip, the individual forces exerted by the cells will change accordingly, but the summated force of the two cells will remain virtually the same as when the airplane was flying straight at the same average speed.

As a concrete example of this averaging effect, a particular barograph cell of the type described, designed for the annunciator, and designed Experimental Diaphragm No. 4, develops a force of 229 grams when actuated by the air pressure equivalent to 120 miles per hour, if allowed to expand just 20/1000 inch. Two similar cells, actuated by this pressure and expanded 20/1000 inch, would thus exert a summated force of 458 grams on the leaf spring 47, if the plane were flying straight at 120 miles per hour. Now at 117 miles per hours and 20/1000 inch expansion this cell develops 207 grams and at 123 miles per hour it develops 250 grams for the same expansion. Thus if the airplane were banked at such an angle that one wing-tip was moving through the air at 117 miles per hour and the other was moving at 123 miles per hour, the summated forces exerted by the two similar diaphragms would be (207+250=) 457 grams. This force would thus cause the annunciator to indicate an airspeed of substantially 120 miles per hour.

While the static head does vary, its variation due to difference in wing tip speeds is negligible for practical purposes, and one static head is sufficient. The advantage of this disposition over that to be obtained by use of two complete Pitot static heads lies in simplification, in reduced weight of connecting tubing, and reduced head resistance due to elimination of one static head.

The case 5 is made in two parts, a front portion 49 and a rear portion 50, with a joint 51 secured by machine screws 52 and made air tight by a rubber gasket 53.

The front portion 49 of the case carries the face plate 54: near the bottom of the face plate is a switch lever 55 with the words "on" and "off" written on the plate to indicate whether the switch circuit is open or closed. The switch housing 56 and arrangement is shown in Figs. IV and II.

Projecting through the face plate 54 on either side of the switch are two knurl-edged adjustment disks 57, 58 (Figs. III, V); concentric and integral with 57, 58 are two gears 59, 60, which connect through chain drives 61 to gears 62, 63 which are connected on the same shafts 64, 65 through the air-tight joints 66, 67, to the low adjustment wheel 68, and the high adjustment wheel 69, respectively.

The adjustment wheels 68, 69 and the indicating wheel 43 are visible through a curved glass window 70 (in the face plate) which carries the hair-line 71. The three wheels 43, 68, 69 are calibrated to read miles per hour and are read at the hair line 71.

The indicating wheel 43 carries a Z-shaped contacting bar 72 (Figs. IV, VI), secured to the web of the wheel at the midpoint of the bar 72. The bar is pointed at both ends and projects at right angles to the web, and the plane of the Z-shaped bar is perpendicular to the radius of the wheel at that point (Figs. IV, VI).

Cooperating with one end of the contacting bar is the plate contact 73 attached to the low adjustment wheel 68 and insulated from it at 74. Similarly the other end of the contacting bar 72 cooperates with the plate contact 75 attached to the high adjustment wheel 69 and insulated from it at 76. The contact plates are faced with platinum and the bar contact is pointed with tungsten.

The forked member 77 (Figs. IV, V and VI), attached to the mechanism supporting frame plate 25, carries the bearings 78 for the indicating wheel shaft 45, and also carries the stops 79 (Fig. IV), 80 (Fig. V) which prevent rotation of the low and high adjustment wheels, respectively, into a position such that the contacting plate 73 would foul the wire 46, or the contacting plate 75 would foul the wire 42 (Figs. IV and V).

81 is a disk resting freely on the shaft 45. In this disk is a slot 82 through which a peg 83 from the web of the indicating wheel passes. When the speed is increasing (or decreasing) the peg moves into one corner of the slot and the disk 81 rotates with the wheel 43 without friction. When the speed becomes constant the moment of inertia of the wheel 43 tends to swing it past the point of equilibrium and thus set up an oscillation about that point. However, when the wheel 43 starts back after the first reversal of direction, the disk 81 continues to rotate in the old direction until the peg 83 encounters the other end of the slot. At that instant the rotating body having less angular momentum, gives up its kinetic energy in neutralizing an equal amount of energy in the other rotating body. If the next swing is of sufficient magnitude the peg moves to the other end of the slot and the process is repeated until the energy of the oscillation is dissipated.

84 (Fig. VII) is a double throw relay, supported on the plate 85 which is made of insulating material. The relay consists of two electro-magnets 86, 87 supporting the armature 88 with the contact rods 89, 90. The armature 88 is held centrally between the electromagnets 86, 87 by the springs 91. The contact rods 89, 90 contact with the contact posts 92, 93, respectively.

94, 95 are two solenoid relays, alike in design. Each solenoid relay consists of a solenoid 96, which acts upon the plunger 97 when the circuit of the solenoid is closed. The movement of the plunger puts the spring 98 in compression and makes contact with the floating contact 99. When the solenoid circuit is broken, the plunger starts to move back under the compression of the spring 98.

The contact 99 does not break with the plunger until the stop 100 encounters the frame 101. When the plunger begins to move back, the disk 102 is held against the piston 103 by the spring 104 of the dashpot 105 and the motion of the plunger is retarded. Thus we have a combination that makes contact quickly and breaks contact slowly, the speed of breaking being regulated by the size and number of holes 106 in the dash pot piston, and by clearance of the piston, by tension of springs 98, by the weight of plunger 97, and similar considerations. This comprises relays of intermittent-impulse steady closing type.

The operation of the instrument is as follows:

When the airplane is in flight, the visual indicator 43 (Fig. II) is free to move within the speed limits indicated by the wheels 68, 69, and responds to the differential of the pressure head system through tubes, diaphragms and pressure sensitive mechanism, to indicate the average speed in miles per hour. If the audible function is not needed, the "low" wheel 68 may be rotated to zero by rotating 57, and the "high" wheel rotated to maximum speed here indicated as 240 m. p. h. by rotating 58, thus leaving 43 free to rotate between zero and 240 m. p. h. If the audible function is required, wheels 68, 69 are set with the desired lower and upper limits coinciding with the cross-hair 71. Switch 55 is turned to "on" position. This makes the electric current (Fig. VIII) operative, by means of which an intonator is sounded if the indicated speed reaches either limit.

Suppose the upper limit is reached so that 43 indicates the speed for which 69 is set. The rod 72 (Figs. VI, VIII) then contacts with plate 75. Current thus flows from the battery 8 through the switch 55, through the coil 86a in relay box 7 (Fig. I), thence back to the instrument through the air-tight entrance 108 (Fig. IV) to insulated plate 75 (Figs. VI, VIII) to the rod 72, through frame members 77, 25 to 103, and thence back to the battery. This flow energizes coil 86a, attracts armature 88 (Fig. VII) to 86, and closes contact between 89 and 92.

It will be evident from the diagram that coil 96a is energized setting solenoid in operation and closing contact between 97 and 99. This closes intonator circuit and 9 sounds. Similarly 10 sounds when lower limit is reached and thus 43 indicates the speed for which 68 is set, contact being effected through 72, 73 (Fig. VI) energizing coil 87a and coil 96a of solenoid relay 95. When bar 72 is in contact with either plate there will be a make and break due to vibration of the plane. This will cause relay 54 to open and close, thus making and breaking the current in the solenoid relay. The intonator circuit will not open during such vibrations, however, since 99 follows the plunger as it starts back and by properly designing and adjusting the dashpot 105 the time lag will be sufficient to prevent the plunger 97 from returning to its open position before the solenoid is magnetized by the following vibration.

Having thus described my invention, what I claim as new and desire to secure by Letters Patent is:

1. In an air speed measuring device for airplanes, the combination of two dynamic pressure heads disposed equal distances from the center line of an airplane and outside of the propeller disturbance area, a static pressure head, an airtight casing containing two similar barograph cells and having a transparent wall portion, tubular means connecting each cell with one dynamic head and the casing with the static head, a speed indicator pointer in said casing, means pivotally mounting said indicator pointer so that it is visible through said transparent portion, lever means connecting said barograph cells to said indicator to produce turning moments on said indicator by the pressure in said cells respectively which are additive in the direction away from zero, and means producing a turning moment on said indicator pointer in the opposite direction toward the zero position.

2. In an air speed measuring device for airplanes, the combination of two dynamic pressure heads disposed equal distances from the center line of an airplane and outside of the propeller disturbance area, a static pressure head, an airtight casing containing two similar barograph cells and having a transparent wall portion, tubular means connecting each cell with one dynamic head and the casing with the static head, a speed indicator pointer in said casing, means pivotally mounting said indicator pointer so that it is visible through said transparent portion, lever means connecting said barograph cells to said indicator to produce turning moments on said indicator by the pressure in said cells respectively which are additive in the direction away from zero, and means to oppose the barograph cells with such a sequence of forces that the displacements of the indicator will be approximately proportional to the airspeed producing a turning moment on said indicator pointer in the opposite direction toward the zero position.

3. In an air speed measuring device for airplanes, the combination of two dynamic pressure heads disposed equal distances from the center line of an airplane and outside of the propeller disturbance area, a static pressure head, an airtight casing containing two similar barograph cells and having a transparent wall portion, tubular means connecting each cell with one dynamic head and the casing with the static head, a speed indicator pointer in said casing, means pivotally mounting said indicator pointer so that it is visible through said transparent portion, lever means connecting said barograph cells to said indicator to produce turning moments on said indicator by the pressure in said cells respectively which are additive in the direction away from zero, and means to oppose the barograph cells with such a sequence of forces that the displacements of indicator will be approximately proportional to the air speed producing a turning moment on said indicator pointer in the opposite direction toward the zero position, an electric switch contact on said indicator pointer, cooperating adjustable electric switch contact stops adapted to close independent annunciator circuits at high and low speeds, annunciator circuits containing intermittent impulse steady closing relays, and intonators of different tones in said circuits disposed in close proximity to the pilot seat.

4. In an air speed measuring device for airplanes, the combination of a pair of dynamic pressure heads disposed on the airplane equal distances from the center line of the airplane and outside the propeller disturbance area, static pressure heads, a casing containing barograph cells, an indicator pointer connected to be actuated by said cells with scale to show the variations of pressure in terms of air speed, an electric switch contact on said indicator pointer, cooperating adjustable electric switch contact stops adapted to close independent annunicator circuits at high and low speeds, annunicator circuits containing intermittent impulse steady closing relays and intonators of different tones in said circuits disposed in close proximity to the pilot seat.

5. In an air speed measuring device for airplanes, the combination of a pair of dynamic pressure heads disposed on the airplane equal distances from the center line of the airplane and outside the propeller disturbance area, static pressure heads, a casing containing barograph cells, an indicator pointer connected to be actuated by said cells with scale to show the variations of pressure in terms of air speed, electric contact means on the said pointer, electric switch contact stops cooperating therewith, annunicator circuits containing intermittent steady closing relays, and intonators of different tones in said circuits disposed in close proximity to the pilot seat.

6. In an air speed measuring device for airplanes, the combination of a pair of dynamic pressure heads disposed on the airplane equal distances from the center line of the airplane and outside the propeller disturbance area, static pressure heads, a casing containing barograph cells, an indicator pointer connected to be actuated by said cells with scale to show the variations of pressure in terms of air speed, electric contact means on the said pointer, electric switch contact stops cooperating therewith, annunicator circuits containing intermittent steady closing relays, and intonators in said circuits disposed in close proximity to the pilot seat.

7. In an air speed measuring device for airplanes, the combination of suitable means comprising a pair of dynamic pressure heads disposed on the airplane equal distances from the center line of the airplane and with an indicator showing the pressure in terms of air speed, and annunicator circuits with intonators controlled by the said indicator to audibly indicate high or low speeds.

In witness whereof I have hereunto set my hand.

WALTON GILBERT.